(12) United States Patent
Sato et al.

(10) Patent No.: US 12,351,476 B2
(45) Date of Patent: Jul. 8, 2025

(54) INFRARED ABSORBING MATERIAL FINE PARTICLE DISPERSION LIQUID AND METHOD FOR PRODUCTION THEREOF

(71) Applicant: SUMITOMO METAL MINING CO., LTD., Tokyo (JP)

(72) Inventors: Keiichi Sato, Isa (JP); Kenji Fukuda, Isa (JP); Yukihiro Koyama, Isa (JP); Hiroki Nakayama, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 961 days.

(21) Appl. No.: 17/280,687

(22) PCT Filed: Aug. 27, 2019

(86) PCT No.: PCT/JP2019/033534
§ 371 (c)(1),
(2) Date: Jul. 28, 2021

(87) PCT Pub. No.: WO2020/066426
PCT Pub. Date: Apr. 2, 2020

(65) Prior Publication Data
US 2021/0380433 A1 Dec. 9, 2021

(30) Foreign Application Priority Data
Sep. 27, 2018 (JP) .................................. 2018-182812

(51) Int. Cl.
*C01G 41/02* (2006.01)
*G02B 5/20* (2006.01)

(52) U.S. Cl.
CPC .......... *C01G 41/02* (2013.01); *C01P 2004/64* (2013.01); *C01P 2006/40* (2013.01); *C01P 2006/60* (2013.01); *C01P 2006/80* (2013.01); *G02B 5/208* (2013.01)

(58) Field of Classification Search
CPC .. C01G 41/02; C01P 2004/64; C01P 2006/40; C01P 2006/60; C01P 2006/80; G02B 5/208
See application file for complete search history.

(56) References Cited

U.S. PATENT DOCUMENTS

| | | | |
|---|---|---|---|
| 6,416,890 B1 | 7/2002 | Terneu et al. | |
| 2003/0186180 A1* | 10/2003 | Ueda | G03C 1/49872 430/536 |
| 2006/0178254 A1* | 8/2006 | Takeda | C09D 5/32 264/171.25 |
| 2011/0024667 A1* | 2/2011 | Mamak | B29C 65/16 423/644 |
| 2011/0195235 A1* | 8/2011 | Kato | C09D 5/32 252/587 |
| 2011/0212832 A1* | 9/2011 | Nakano | B01J 37/0219 502/305 |
| 2012/0316056 A1 | 12/2012 | Nakano et al. | |
| 2014/0187412 A1 | 7/2014 | Nakano et al. | |
| 2019/0002108 A1* | 1/2019 | Bruno | B64D 13/06 |
| 2019/0002708 A1 | 1/2019 | Tsunematsu et al. | |

FOREIGN PATENT DOCUMENTS

| | | | | |
|---|---|---|---|---|
| EP | 2 682 265 A1 | 1/2014 | | |
| JP | H08-12378 A | 1/1996 | | |
| JP | H08-59300 A | 3/1996 | | |
| JP | H08-73223 A | 3/1996 | | |
| JP | H08-283044 A | 10/1996 | | |
| JP | H09-127559 A | 5/1997 | | |
| JP | 2000-119045 A | 4/2000 | | |
| JP | 2003-121884 A | 4/2003 | | |
| JP | 2012082109 A * | 4/2012 | | C01G 41/00 |
| JP | 2017109892 A * | 6/2017 | | B60J 1/00 |
| WO | 2005/037932 A1 | 4/2005 | | |
| WO | 2009/110234 A1 | 9/2009 | | |
| WO | 2017/104854 A1 | 6/2017 | | |

OTHER PUBLICATIONS

Nov. 26, 2019 International Search Report issued in International Patent Application No. PCT/JP2019/033534.
Aug. 10, 2022, Search Report issued in European Patent Application No. 19864140.9.
Mar. 23, 2021 International Preliminary Report on Patentability issued in International Patent Application No. PCT/JP2019/033534.

* cited by examiner

*Primary Examiner* — Bijan Ahvazi
(74) *Attorney, Agent, or Firm* — Oliff PLC

(57) ABSTRACT

An infrared absorbing material fine particle dispersion liquid including infrared absorbing material fine particles and a solvent, the infrared absorbing material fine particles containing fine particles of composite tungsten oxide represented by a general formula $M_xW_yO_y$, the solvent containing water, wherein an absolute value of a zeta potential of the infrared absorbing material fine particle dispersion liquid is 5 mV or more and 100 mV or less.

12 Claims, No Drawings

INFRARED ABSORBING MATERIAL FINE PARTICLE DISPERSION LIQUID AND METHOD FOR PRODUCTION THEREOF

TECHNICAL FIELD

The present invention relates to an infrared absorbing material fine particle dispersion liquid including infrared absorbing material fine particles and a solvent, more specifically, an infrared absorbing material fine particle dispersion liquid which includes an infrared absorbing material fine particle containing a composite tungsten oxide fine particle, and a solvent containing water; and to a method for production thereof.

BACKGROUND ART

In recent years, the demand for infrared absorbers has been increasing rapidly, and many proposals have been made for infrared absorbers.

Generally considering the proposal for these infrared absorbers from a functional point of view, for example, in the field of window materials for various buildings and vehicles, some infrared absorbers are aimed at shielding light in the near-infrared region while sufficiently letting in visible light so as to suppress an increase in indoor temperature while maintaining brightness.

Next, generally considering the proposal for these infrared absorbers from a viewpoint of a shielding material, various types of shielding materials to be used for window materials and the like have been proposed, for example, a shielding material using an inorganic pigment such as carbon black, titanium black, or the like, which has absorption properties from the visible light region to near-infrared region; a shielding material using a black pigment including an organic pigment such as aniline black, which has strong absorption properties only for the visible light region; and a half-mirror type shielding material with metal such as aluminum vapor-deposited thereon.

For example, Patent Document 1 as a prior art document proposes an infrared shielding glass which can be preferably used for a portion where a high visible light transmittance and a good infrared shielding performance is required, since it includes on a transparent glass substrate, from the substrate side: a first layer, a composite tungsten oxide film containing at least one metal ion selected from the group consisting of Group IIIa, IVa, Vb, VIb and VIIb of the Periodic Table; a second layer provided on the first layer, a transparent dielectric film; and a third layer provided on the second layer, a composite tungsten oxide film containing at least one metal ion selected from the group consisting of Group IIIa, IVa, Vb, VIb and VIIb of the Periodic Table; and the refractive index of the transparent dielectric film of the second layer is lower than the refractive index of the composite tungsten oxide film of the first layer and the third layer.

Patent Document 2 proposes an infrared shielding glass which includes on a transparent glass substrate, from a substrate side: a first layer, a first dielectric film; a second layer provided on the first layer, a tungsten oxide film; and a third layer provided on the second layer, a second dielectric film, in a manner similar to that in Patent Document 1.

Patent Document 3 proposes a heat ray shielding glass which includes on a transparent glass substrate, from a substrate side: a first layer, a composite tungsten oxide film containing a metal element similar to that in Patent Document 1; and a second layer provided on the first layer, a transparent dielectric film, in a manner similar to that in Patent Document 1.

Patent Document 4 proposes a sunlight control glass sheet having sunlight shielding properties which is formed by coating a film of metal oxide selected from at least one of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$), and vanadium dioxide ($VO_2$), containing an additive element such as hydrogen, lithium, sodium, or potassium, according to a CVD method or a spraying method, followed by thermolysis at about 250° C.

Patent Document 5 proposes a light-control and heat-insulation material whose transmittance is variable by irradiation of sunlight using tungsten oxide obtained by hydrolyzing a tungstic acid, in which an organic polymer, called polyvinylpyrrolidone, having a particular structure is added to the tungsten oxide.

When the light-control and heat-insulation material whose transmittance is variable by irradiation of sunlight is irradiated with sunlight, the ultraviolet ray in the light is absorbed by the tungsten oxide, generating excited electrons and holes, and a small amount of ultraviolet ray significantly increases the amount of pentavalent tungsten which appears, resulting in a faster coloration reaction along with a higher coloring density. On the other hand, when the light is shielded, the pentavalent tungsten is oxidized to hexavalent very quickly, resulting in a high fading reaction. It is proposed that a light-control and heat-insulation material whose transmittance is variable by irradiation of sunlight can be obtained which utilizes the coloration/fading properties and gives a fast coloration and fading response to sunlight and exhibits an absorption peak at a wavelength of 1,250 nm in the near-infrared region at a time of coloration, thereby shielding the near-infrared ray of the sunlight.

On the other hand, in Patent Document 6, the present inventors disclose that tungsten hexachloride is dissolved in alcohol, and directly thereafter or after heating to reflux, the medium is evaporated and then heated at 100° C. to 500° C. to obtain tungsten oxide fine particle powder including tungsten trioxide or its hydrate, or a mixture thereof. The present inventors also disclose that electrochromic devices can be obtained using the tungsten oxide fine particles, and that the optical properties of the films can be changed when a multilayered laminate is constructed and protons are introduced into the films, and the like.

Patent Document 7 proposes a method for fabricating various kinds of tungsten bronze represented by a general formula $M_xWO_3$ (wherein M is metal elements such as alkaline metals, alkaline earth metals, rare earth metals, etc., $0<x<1$), in which ammonium metatungstate and various water-soluble metal salts are used as raw materials, and a dried solid of an aqueous mixed solution of the starting materials is heated at a heating temperature of about 300 to 700° C. while supplying hydrogen gas including an inert gas (addition amount: about 50 vol % or more) or water vapor (addition amount: about 15 vol % or less) added thereto. It also proposes that various tungsten bronze-coated composites are produced by performing the operation on a substrate, and used as electrode catalyst materials for fuel cells or the like.

In Patent Document 8, the present inventors disclose an infrared shielding material fine particle dispersion in which infrared shielding material fine particles are dispersed in a medium such as a resin, and optical properties, conductivity, and a production method of the infrared shielding material fine particle dispersion.

Note that the infrared shielding material fine particles are fine particles of tungsten oxide represented by a general formula WyOz (wherein W is tungsten, O is oxygen, 2.2≤z/y≤2.999), and/or fine particles of composite tungsten oxide represented by a general formula MxWyOz (wherein M is one or more elements selected from H, He, alkali metals, alkaline earth metals, rare-earth elements, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, 0.001≤x/y≤1, and 2.2≤z/y≤3.0), and a particle diameter of the infrared shielding material fine particle is 1 nm or more and 800 nm or less.

PRIOR ART DOCUMENT

Patent Document

[Patent Document 1] Japanese Patent Laid-Open Publication No. 1996-59300
[Patent Document 2] Japanese Patent Laid-Open Publication No. 1996-12378
[Patent Document 3] Japanese Patent Laid-Open Publication No. 1996-283044
[Patent Document 4] Japanese Patent Laid-Open Publication No. 2000-119045
[Patent Document 5] Japanese Patent Laid-Open Publication No. 1997-127559
[Patent Document 6] Japanese Patent Laid-Open Publication No. 2003-121884
[Patent Document 7] Japanese Patent Laid-Open Publication No. 1996-73223
[Patent Document 8] WO 2005/37932

SUMMARY OF THE INVENTION

Problems to be solved by the Invention

In order to obtain an infrared absorbing material fine particle dispersion in which infrared absorbing material fine particles are dispersed in a medium such as a resin, for example, a method can be employed that includes preparing an infrared absorbing material fine particle dispersion liquid in which the infrared absorbing material fine particles are dispersed in a solvent, subsequently dissolving a resin or the like in the infrared absorbing material fine particle dispersion liquid to form a coating liquid, and drying the coating liquid after applying it to a base material.

In recent years, it has been required to reduce the environmental load for various industrial materials. Therefore, in the above-mentioned coating liquid, the solvent is required to contain water.

However, the above-mentioned prior art documents describe the technology for the infrared absorbing material fine particle dispersion liquid in which the composite tungsten oxide fine particles and the like are dispersed in an organic solvent having low solubility in water such as toluene. There is no disclosure about the infrared absorbing material fine particle dispersion liquid in which the solvent contains or consists of water.

The present invention has been made under the above-mentioned circumstances, and a problem to be solved is to provide an infrared absorbing material fine particle dispersion liquid having excellent long-term storage stability even when a solvent contains or consists of water, and a method for production thereof.

Means for solving the Problems

In order to solve the above-mentioned problem, the present inventors studied. As the result, the present inventors found a revolutionary knowledge that the infrared absorbing material fine particle dispersion liquid is excellent in long-term storage stability when it has a predetermined zeta potential, and completed the present invention.

Namely, a first invention to solve the above-mentioned problem is
an infrared absorbing material fine particle dispersion liquid including infrared absorbing material fine particles and a solvent,
the infrared absorbing material fine particle containing fine particles of composite tungsten oxide represented by a general formula MxWOy (wherein M is one or more elements selected from Cs, Rb, K, Tl, and Ba, 0.1≤x≤0.5, 2.2≤y≤3.0), and
the solvent containing water,
wherein an absolute value of a zeta potential of the infrared absorbing material fine particle dispersion liquid is 5 mV or more and 100 mV or less.

A second invention is
the infrared absorbing material fine particle dispersion liquid according to the first invention,
wherein the zeta potential is −100 mV or more and −5 mV or less.

A third invention is
the infrared absorbing material fine particle dispersion liquid according to the first or second invention,
wherein a pH value is 4 or more.

A fourth invention is
the infrared absorbing material fine particle dispersion liquid according to any one of the first to third inventions,
wherein the particle size of the composite tungsten oxide fine particle is 800 nm or less.

A fifth invention is
the infrared absorbing material fine particle dispersion liquid according to any one of the first to fourth inventions,
further including at least one dispersant.

A sixth invention is
the infrared absorbing material fine particle dispersion liquid according to the fifth invention,
wherein the dispersant contains at least any one of amino group and oxo acid group.

A seventh invention is
the infrared absorbing material fine particle dispersion liquid according to any one of the first to sixth inventions,
wherein the content of the infrared absorbing material fine particles included in the infrared absorbing material fine particle dispersion liquid is 0.01 mass % or more and 80 mass % or less.

An eighth invention is
a method for producing an infrared absorbing material fine particle dispersion liquid including infrared absorbing material fine particles and a solvent, including
dispersing the infrared absorbing material fine particles containing fine particles of composite tungsten oxide represented by a general formula MxWOy (wherein M is one or more elements selected from Cs, Rb, K, Tl, and Ba, 0.1≤x≤0.5, 2.2≤y≤3.0) in the solvent containing water to obtain an infrared absorbing material fine particle dispersion liquid,
wherein an absolute value of a zeta potential of the infrared absorbing material fine particle dispersion liquid is 5 mV or more and 100 mV or less.

A ninth invention is
the method for producing an infrared absorbing material fine particle dispersion liquid according to the eighth invention,
wherein a pH value of the infrared absorbing material fine particle dispersion liquid is 4 or more.

Advantage of the Invention

According to the present invention, the infrared absorbing material fine particle dispersion liquid excellent in long-term storage stability can be obtained while using a solvent containing water. In addition, the occurrence of the bleed out can be suppressed when the infrared absorbing material fine particle dispersion liquid and the binder are mixed to form a film.

DETAILED DESCRIPTION OF THE INVENTION

The infrared absorbing material fine particle dispersion liquid according to the present invention is
an infrared absorbing material fine particle dispersion liquid including infrared absorbing material fine particles and a solvent,
the infrared absorbing material fine particle containing fine particles of composite tungsten oxide represented by the general formula MxWOy (wherein M element is one or more elements selected from Cs, Rb, K, Tl, and Ba, $0.1 \leq x \leq 0.5$, $2.2 \leq y \leq 3.0$), and
the solvent containing water,
wherein an absolute value of a zeta potential of the infrared absorbing material fine particle dispersion liquid is 5 mV or more and 100 mV or less.

The infrared absorbing material fine particle dispersion liquid according to the present invention will be described hereinafter in the order of: [1] Infrared absorbing material fine particles, [2] Solvent used for infrared absorbing material fine particle dispersion liquid, [3] Infrared absorbing material fine particle dispersion liquid, [4] Dispersant added to infrared absorbing material fine particle dispersion liquid, [5] Method for producing infrared absorbing material fine particles, [6] Method for producing infrared absorbing material fine particle dispersion liquid, and [7] Method for using infrared absorbing material fine particle dispersion liquid.

[1] Infrared Absorbing Material Fine Particles

The infrared absorbing material fine particle dispersion liquid according to the present invention includes at least fine particles of composite tungsten oxide represented by the general formula MxWOz (wherein M element is one or more elements selected from Cs, Rb, K, Tl, and Ba, $0.1 \leq x \leq 0.5$, $2.2 \leq y \leq 3.0$).

The infrared absorbing material fine particles according to the present invention will be described taking composite tungsten oxide fine particles as an example.

It is generally known that a material containing free electrons exhibits a reflection/absorption response due to plasma oscillation, with respect to an electromagnetic wave around sunlight region having a wavelength of 200 nm to 2,600 nm. It is known that when the particles of the material are fine particles having particle diameters smaller than the wavelength of light, the geometric scattering of the material in the visible light region (wavelength: 380 nm to 780 nm) is reduced so that transparency in the visible light region is achieved.

The term "transparency" used in the present invention means "high transmittance with less scattering of light in the visible light region".

Since tungsten oxide ($WO_3$) includes no effective free electrons existing therein, it has less absorption/reflection properties in the infrared region and thus is not effective as an infrared absorbing material fine particle. However, it is well known that a configuration of $WO_3$ with oxygen defect or a configuration of composite tungsten oxide in which an element such as Cs is added to $WO_3$ allows generation of free electrons in the tungsten oxide or composite tungsten oxide to develop absorption properties derived from free electrons in the infrared region. Further, analysis of single crystals of these materials with free electrons and the like suggested the response of free electrons to light in the infrared region.

For the $WO_3$, since the control of the amount of oxygen and the configuration in which an element that generates free electrons is added are used in combination, more efficient infrared absorbing material fine particles can be obtained. With this configuration, free electrons are generated in the composite tungsten oxide, and strong absorption properties derived from the free electrons are exhibited particularly in the near-infrared region. Accordingly, the composite tungsten oxide becomes effective as a near-infrared absorbing material fine particle around a wavelength of 1,000 nm.

When the infrared absorbing material fine particle, in which control of the amount of oxygen and the addition of M element that generates free electrons are used in combination, is represented by the genera formula MxWyOz (wherein M is preferably one or more elements selected from Cs, Rb, K, Tl, and Ba, W is tungsten, and 0 is oxygen), a relationship of $0.001 \leq x/y \leq 1$, $2.2 \leq z/y \leq 3$ is satisfied.

Regarding the value of x/y which indicates an addition amount of the M element, when the value of x/y is more than 0.001, sufficient free electrons are generated in the composite tungsten oxide, and a targeted infrared absorption effect can be obtained. As the addition amount of the M element increases, the supply amount of the free electrons increases and the infrared absorption efficiency also increases, but the effect is saturated when the value of x/y is about 1. Further, when the value of x/y is less than 1, generation of an impurity phase in the infrared absorbing material fine particles can be avoided, which is preferable.

Moreover, as for the value of z/y indicating a control of an oxygen amount, the mechanism similar to that of the above-mentioned tungsten oxide represented by $WO_3$ works in the composite tungsten oxide represented by MxWyOz. In addition, even when z/y=3.0 or $2.0 \leq z/y \leq 2.2$ is satisfied, there is a supply of the free electrons due to the above-mentioned addition amount of the M element. Preferably $2.45 \leq z/y \leq 3.0$.

Moreover, when the composite tungsten oxide fine particle has a hexagonal crystal structure, the transmission of the fine particle in the visible light region is improved, and the absorption in the infrared region is improved.

When the composite tungsten oxide fine particles each having a hexagonal crystal structure have a uniform crystal structure, the addition amount of M element in terms of the value of x/y is preferably 0.2 or more and 0.5 or less, more preferably 0.33. It is considered that when the value of x/y becomes 0.33, the above-mentioned M element is arranged in all the hexagonal voids.

When there exists a cation of the M element which is added in the hexagonal void, the transmission of light in the visible light region is improved and the absorption in the infrared region is improved. In general, the hexagonal crystal is likely to be formed when the M element having a large ionic radius is added. Specifically, when the M element is one or more elements selected from Cs, Rb, K, Tl, and Ba, a hexagonal crystal is likely to be formed. Typical examples preferably include, but are not limited to, $Cs_{0.33}WO_z$, $Cs_{0.03}Rb_{0.30}WO_z$, $Rb_{0.33}WO_z$, $K_{0.33}WO_z$, $Ba_{0.33}WO_z$ ($2.0 \leq z \leq 3.0$). Of course, elements other than these elements can be used as long as the above-mentioned M element is present in the hexagonal void formed by the $WO_6$ units.

When composite tungsten oxide fine particles each having the hexagonal crystalline structure have a uniform crystal structure, the addition amount of the M element in terms of the value of x/y is preferably 0.2 or more and 0.5 or less, and more preferably 0.33. It is considered that when the value of x/y becomes 0.33, the above-mentioned M element is arranged in all the hexagonal voids.

In addition to a hexagonal crystal, a tetragonal or cubic crystal composite tungsten oxide is also effective as an infrared absorbing material fine particle. However, the absorption position of the infrared region tends to vary depending on the crystal structure, and the absorption position tends to shift toward the longer wavelength side in the order of cubic<tetragonal<hexagonal. Concomitantly, the hexagonal, tetragonal, and cubic crystals absorb in the visible light region in ascending order.

Therefore, it is preferable to use the hexagonal composite tungsten oxide for an application in which light in the visible light region is transmitted more and light in the infrared region is absorbed more. However, since the tendency of the optical properties described herein is only a general tendency and may vary depending on the type and amount of the added element, and the amount of oxygen, the present invention is not limited thereto.

The above-mentioned composite tungsten oxide fine particles greatly absorb light in the infrared region, particularly around a wavelength of 1,000 nm, and thus their transmission color tone is often blue to green.

Further, each of the infrared absorbing material fine particles according to the present invention preferably has a particle size of 1 nm or more and 800 nm or less, and more preferably 100 nm or less. From a viewpoint of exhibiting more excellent visible light transmission properties and infrared absorption properties, the particle size of the fine particle is preferably 1 nm or more and 40 nm or less, more preferably 1 nm or more and 30 nm or less, and most preferably 1 nm or more and 25 nm or less. The above-mentioned particle size is preferred because scattering due to Mie scattering and Rayleigh scattering of the fine particles can be sufficiently suppressed, and visibility in the visible light wavelength region can be maintained and transparency can be efficiently maintained.

Here, the particle size is an average value of the diameters of the individual infrared absorbing material fine particles which are not aggregated, and is an average particle size of the individual infrared absorbing material fine particles which are not aggregated and contained in the infrared absorbing material fine particle dispersion liquid described later. The average particle size of the infrared absorbing material fine particles is measured and calculated from an electron microscope image of the infrared

[2] Solvent Used for Infrared Absorbing Material Fine Particle Dispersion Liquid The solvent used for the infrared absorbing material fine particle dispersion liquid according to the present invention contains water in its composition. The phrase "contains water in its composition" used herein means that the solvent contains 1 mass % or more of water, and encompasses a concept including a mixed solvent of water and an organic solvent compatible with water such as alcohols and glycols. The concept also encompasses a solvent consisting of water.

In the present invention, water is a concept including ion-exchanged water in which an anion such as chlorine is removed with an ion-exchange resin, ultrapure water, and the like.

[3] Infrared Absorbing Material Fine Particle Dispersion Liquid

The infrared absorbing material fine particle dispersion liquid according to the present invention is a dispersion liquid in which the above-mentioned infrared absorbing material fine particles are dispersed in a solvent.

The infrared absorbing material fine particle dispersion liquid according to the present invention is a dispersion liquid in which an absolute value of a zeta potential is in a range of 5 mV or more and 100 mV or less. That is, it is a dispersion liquid in which the value of the zeta potential is in a range of 5 mV or more and 100 mV or less, or –100 mV or more and –5 mV or less.

It is based on the findings that gelation and particle precipitation can be avoided for 6 months or more at a temperature of 25° C. in the infrared absorbing material fine particle dispersion liquid according to the present invention in which the absolute value of the zeta potential of the dispersion liquid is in the range of 5 mV or more and 100 mV or less, preferably in the range of 10 mV or more and 100 mV or less. From this point of view, the zeta potential is –100 mV or more and –5 mV or less, more preferably the zeta potential is –100 mV or more and –10 mV or less.

Further, in the infrared absorbing material fine particle dispersion liquid according to the present invention, the dispersed particle size of the infrared absorbing material fine particle can be selected depending on the intended use.

In the present invention, the dispersed particle size of the infrared absorbing material fine particle is different from the particle size of the infrared absorbing material fine particle mentioned above, and is a concept encompassing a particle size of an aggregate of the infrared absorbing material fine particles as well.

When the infrared absorbing material fine particle dispersion liquid according to the present invention is used for applications where transparency is required to be maintained, the infrared absorbing material fine particle preferably has a dispersed particle size of 800 nm or less in the dispersion liquid. It is because particles with the dispersed particle size smaller than 800 nm can maintain the visibility in the visible light region without completely shielding light due to scattering, and at the same time efficiently maintain the transparency.

In the infrared absorbing material fine particle dispersion liquid according to the present invention, particularly when the transparency of the visible light region is focused, it is preferable to also consider the scattering due to particles.

When the reduction of the scattering due to the particles is focused, the dispersed particle size of the infrared absorbing material fine particle in the dispersion liquid is 200 nm or less, preferably 100 nm or less. The reason is as follows. When the dispersed particle size of the infrared absorbing material fine particle is small, scattering of the light with wavelength from 400 nm to 780 nm in the visible light region due to geometric or Mie scattering is reduced, and thereby the infrared absorbing layer can be avoided from looking like fogged glass and losing clear transparency. In other words, when the dispersed particle size of the infrared absorbing material fine particle in the dispersion liquid is 200 nm or less, the above-mentioned geometrical scattering or Mie scattering is reduced, resulting in Rayleigh scattering region. In the Rayleigh scattering region, the scattered light is in proportion to the sixth power of the particle size. Therefore, with the decrease of the dispersed particle size, the scattering is reduced and the transparency is improved.

In addition, when the dispersed particle size is 100 nm or less, the scattered light extremely decreases, which is preferable. From the viewpoint of avoiding light scattering, the smaller dispersed particle size is more preferable. When the dispersed particle size is 1 nm or more, industrial production is easy.

When the above-mentioned dispersed particle size is 800 nm or less, the haze value of the infrared absorbing material fine particle dispersion in which the infrared absorbing material fine particles according to the present invention are dispersed in a medium can be reduced to 30% or less at the visible light transmittance of 85% or less. On the other hand, when the haze value is less than 30%, the appearance of the infrared absorbing material fine particle dispersion does not look like fogged glass, and clear transparency can be obtained.

The dispersed particle size of the infrared absorbing material fine particle can be measured using ELS-8000 manufactured by Otsuka Electronics Co., Ltd. based on a dynamic light scattering method.

[4] Dispersant Added to Infrared Absorbing Material Fine Particle Dispersion Liquid The zeta potential of the infrared absorbing material fine particle dispersion liquid according to the present invention can be controlled by adjusting the pH of the dispersion liquid, adding the dispersant to the dispersion liquid.

Specifically, the pH values of the infrared absorbing material fine particle dispersion liquid are preferably 3 or more and 10 or less, and more preferably 4 or more and 7 or less. Addition of a weak acid or the like to the dispersion liquid is also effective for the pH adjustment.

On the other hand, when the dispersant is added to the infrared absorbing material fine particle dispersion liquid according to the present invention, it is preferable to add a water-soluble dispersant having an amino group. For example, preferable examples of a commercially available dispersant include Disperbyk183, Disperbyk185, Disperbyk184, Disperbyk190, Disperbyk191, Disperbyk2010 (manufactured by BYK Inc.).

Further, amino acids such as serine and phenylalanine may be added as the dispersant.

Furthermore, preferable examples of a dispersant also include a water-soluble dispersant containing an oxo acid. Preferable examples of the oxo acid include carboxyl group. For example, preferable examples of commercially available dispersants include Solsperse 41090, Solsperse 43000, Solsperse 44000, Solsperse 46000, Solsperse 47000, Solsperse 53095 (manufactured by Lubrizol Corporation).

In a case of a polymer dispersant, addition of a large amount of the dispersant to the infrared absorbing material fine particle dispersion liquid causes a decrease in the absolute value of the zeta potential. In some cases, long-term stability is maintained due to an effect of the polymer dispersant. In this case, however, when a binder is further mixed to form a film, bleed out occurs. On the other hand, the addition of the polymer dispersant to the infrared absorbing material fine particle dispersion liquid does not cause significant bleed out, so long as the amount of the polymer dispersant added is such that it does not cause a decrease in the absolute value of the zeta potential.

In contrast, in a case of a low molecular weight dispersant, the addition of the dispersant to the infrared absorbing material fine particle dispersion liquid does not cause significant bleed out.

A dried film is obtained by preparing a mixed solution including the infrared absorbing material fine particle dispersion liquid and a binder such as a resin added thereto, coating the resulting mixed solution to a substrate to obtain a coated film, and further heating and drying the coated film. In this case, exudation derived from the mixed solution may occur on the dried film. Such exudation is referred to as "bleed out". Significant bleed out can be visually observed.

From the above-mentioned viewpoint, the preferable amount of the polymer dispersant added to the infrared absorbing material fine particle dispersion liquid is less than 2 parts by mass of the polymer dispersant based on 1 part by mass of the infrared absorbing material fine particles, more preferably, 0.2 parts by mass or more and 1.5 parts by mass or less based on 1 part by mass of the infrared absorbing material fine particles, and still more preferably 0.3 parts by mass or more and 1.2 parts by mass or less based on 1 part by mass of the infrared absorbing material fine particles.

[5] Method for Producing Infrared Absorbing Material Fine Particles

A method for producing infrared absorbing material fine particles included in the infrared absorbing material fine particle dispersion liquid according to the present invention will be described using an exemplary production of the composite tungsten oxide fine particles via a solid phase reaction by way of example.

A tungsten compound and an M element compound are used as raw materials. The tungsten compound is preferably one or more kinds selected from tungstic acid ($H_2WO_4$), ammonium tungstate, tungsten hexachloride, and tungsten hydrate obtained by adding water to tungsten hexachloride dissolved in alcohol for hydrolysis followed by evaporation of the solvent.

On the other hand, the M element compound used for producing the raw material of the fine particles of the composite tungsten oxide represented by the general formula $M_xW_yO_z$ (wherein M is one or more elements selected from Cs, Rb, K, Tl, and Ba, satisfying $0.001 \leq x/y \leq 1$, $2.2 \leq z/y \leq 3.0$), which is a preferable embodiment, is preferably one or more kinds selected from oxides, hydroxides, nitrates, sulfates, chlorides, carbonates of M element.

The tungsten compound and the M element compound can be wet-mixed to produce a mixed powder. The produced mixed powder is heated in one step in an inert gas alone or in a mixed gas atmosphere of an inert gas and a reducing gas. At this time, the heating temperature is preferably close to the temperature at which the composite tungsten oxide fine particles begin to crystallize Specifically, the heating temperature is preferably 1,000° C. or less, more preferably 800° C. or less, and still more preferably 800° C. or less and 500° C. or more.

[6] Method for Producing Infrared Absorbing Material Fine Particle Dispersion Liquid A method for producing an infrared absorbing material fine particle dispersion liquid including infrared absorbing material fine particles and a solvent according to the present invention includes dispersing the above-mentioned infrared absorbing material fine particles containing the composite tungsten oxide fine particles represented by the general formula $M_xWO_y$ in the above-mentioned solvent to produce an infrared absorbing material fine particle dispersion liquid so that an absolute value of a zeta potential of the dispersion liquid is within a predetermined range.

In order to obtain the infrared absorbing material fine particle dispersion liquid according to the present invention, it is important to ensure the dispersion state of the infrared absorbing material fine particles during the pulverization/dispersion treatment step and not to agglomerate the fine particles. That is, the infrared absorbing material particles are added to the solvent, and pulverization/dispersion treatment is performed until the above-mentioned particle size is obtained. At this time, it is preferable to add the above-mentioned dispersant and adjust the pH value as appropriate.

Then, it is sufficient that the absolute value of the zeta potential of the infrared absorbing material fine particle dispersion liquid after the pulverization/dispersion treatment can be maintained at 5 mV or more and 100 mV or less.

Specific examples of a method of the pulverization/dispersion treatment include a pulverization/dispersion treatment method using a device such as a bead mill, a ball mill, a sand mill, a paint shaker, an ultrasonic homogenizer, or the like. Especially, performing pulverization/dispersion treatment with a medium stirring mill such as a bead mill, a ball mill, a sand mill, a paint shaker or the like using media such as beads, balls, Ottawa sand, or the like is preferable because the time required to attain a desired dispersed particle size is short.

In addition, a content of the infrared absorbing material fine particles included in the infrared absorbing material fine particle dispersion liquid according to the present invention is 0.01 mass % or more and 80 mass % or less from the viewpoint of ease of use and stability of the dispersion liquid.

[7] Method for Using Infrared Absorbing Material Fine Particle Dispersion Liquid A water-soluble polystyrene, a water-soluble styrene-butadiene copolymer, an emulsion of a water-soluble acrylate ester copolymer, or the like, as a binder, is added and mixed to the infrared absorbing material fine particle dispersion liquid according to the present invention to produce a water-soluble coating liquid including the infrared absorbing material fine particles according to the present invention.

When the produced coating liquid is coated to a substrate such as glass and dried, the film coated with the coating liquid is cured, and an infrared absorbing material fine particle dispersion can be obtained. For example, when the substrate is glass, glass including an infrared absorbing material fine particle dispersion can be obtained. The resulting glass can be used for a window or the like to provide an infrared shielding window.

Of course, the infrared absorbing material fine particle dispersion liquid and the coating liquid according to the present invention are not limited to infrared shielding window applications, and can be widely used in sites where an infrared absorbing material is required.

Further, the infrared absorbing material fine particle dispersion liquid and coating liquid according to the present invention can be applied to known coating methods such as inkjet and spray coating.

EXAMPLES

Hereinafter, the present invention will be specifically described with reference to examples. However, the present invention is not limited to the examples.

Example 1

To 0.330 kg of water, 0.216 kg of $Cs_2CO_3$ was added and dissolved. The resulting solution was added to 1.000 kg of $H_2WO_4$, which was sufficiently stirred, and then dried to obtain a dried product. While feeding 5% $H_2$ gas with $N_2$ gas as a carrier, the dried product was heated, and heated at a temperature of 800° C. for 1 hour. Thereafter, the solid-phase method was performed, which further includes heating the dried product at 800° C. in the $N_2$ gas atmosphere for 2 hours, to obtain the composite tungsten oxide ($Cs_{0.33}WO_3$).

Forty grams (20 mass %) of the resulting composite tungsten oxide, 160 g (80 mass %) of ion-exchanged water as a solvent, and 750 g of φ0.3 zirconia beads were loaded in a paint shaker. Then, pulverization/dispersion treatment was carried out to obtain the infrared absorbing material fine particle dispersion liquid according to Example 1.

The zeta potential of the obtained infrared absorbing material fine particle dispersion liquid was measured to be −62 mV using a zeta potential analyzer (DT-200: manufactured by Nihon Rufuto Co., Ltd.). The pH value was measured to be 4.1 using a pH meter (Portable pH Meter D-71, manufactured by HORIBA, Ltd.). The measurement results are shown in Table 1.

Moreover, 100 mL of the obtained infrared absorbing material fine particle dispersion liquid was charged in a sample bottle and stored at 25° C. for 6 months, and then the bottom of the sample bottle was visually observed to find no precipitation. The confirmed results are shown in Table 1.

Further, a silica binder with a solid content of 25% was mixed with the obtained infrared absorbing material fine particle dispersion liquid so as to be 3 parts by mass based on 1 part by mass of the infrared absorbing material fine particles, to obtain a mixed solution. The mixed solution was coated on a glass plate and dried at 180° C. for 30 minutes to obtain a dried film according to Example 1. Then, using an electron microscope image, the average particle size ($D_{50}$ particle size) of the infrared absorbing material fine particles in the dried film according to Example 1 was measured. The measurement results are shown in Table 1. Moreover, the dried film according to Example 1 was visually observed to find no bleed out.

Example 2

Forty grams (20 mass %) of the composite tungsten oxide produced in Example 1, 16 g (8 mass %) of a commercially available polymer dispersant A (a compound containing organic oxo acid), 144 g (72 mass %) of water, and 750 g of φ0.3 zirconia beads were loaded into a paint shaker. Then, pulverization/dispersion treatment was carried out in the same manner as in Example 1 to obtain an infrared absorbing material fine particle dispersion liquid and a dried film according to Example 2.

The obtained infrared absorbing material fine particle dispersion liquid and the dried film according to Example 2 were evaluated and confirmed in the same manner as in Example 1. The zeta potential was −40 mV and the pH value was 6.9. The evaluation and confirmed results are shown in Table 1.

Example 3

Forty grams (20 mass %) of the composite tungsten oxide produced in Example 1, 40 g (20 mass %) of phenylalanine as a low molecular weight dispersant B, 120 g (60 mass %) of water, and 750 g of φ0.3 zirconia beads were loaded into a paint shaker. Then, pulverization/dispersion treatment was carried out in the same manner as in Example 1 to obtain an infrared absorbing material fine particle dispersion liquid and a dried film according to Example 3.

The obtained infrared absorbing material fine particle dispersion liquid and the dried film according to Example 3 were evaluated and confirmed in the same manner as in Example 1. The zeta potential was −70 mV and the pH value was 5.3. The evaluation and confirmed results are shown in Table 1.

Example 4

Forty grams (20 mass %) of the composite tungsten oxide produced in Example 1, 16 g (8 mass %) of a commercially available polymer dispersant C (a block copolymer having an amino group), 144 g (72 mass %) of water, and 750 g of φ0.3 zirconia beads were loaded into a paint shaker. Then, pulverization/dispersion treatment was carried out in the same manner as in Example 1 to obtain an infrared absorbing material fine particle dispersion liquid and a dried film according to Example 4.

The obtained infrared absorbing material fine particle dispersion liquid and the dried film according to Example 4 were evaluated and confirmed in the same manner as in Example 1. The zeta potential was −23 mV and the pH value was 6.5. The evaluation and confirmed results are shown in Table 1.

Comparative Example 1

In the same manner as in Example 1, except that hydrochloric acid as a reagent which is an acid agent was added to the infrared absorbing material fine particle dispersion liquid according to Example 1 to adjust the zeta potential and the pH value, an infrared absorbing material fine particle dispersion liquid and a dried film according to Comparative Example 1 were obtained.

The obtained infrared absorbing material fine particle dispersion liquid and the dried film were evaluated and confirmed in the same manner as in Example 1. The zeta potential was 2 mV and the pH value was 2.4. The evaluation and confirmed results are shown in Table 1.

Comparative Example 2

In the same manner as in Example 1, except that hydrochloric acid as a reagent which is an acid agent was added to the infrared absorbing material fine particle dispersion liquid according to Example 2 to adjust the zeta potential and the pH value, an infrared absorbing material fine particle dispersion liquid and a dried film according to Comparative Example 2 were obtained.

The obtained infrared absorbing material fine particle dispersion liquid and the dried film were evaluated and confirmed in the same manner as in Example 1. The zeta potential was −1 mV and the pH value was 2.5. The evaluation and confirmed results are shown in Table 1.

Comparative Example 3

In the same manner as in Example 1, except that hydrochloric acid as a reagent which is an acid agent was added to the infrared absorbing material fine particle dispersion liquid according to Example 3 to adjust the zeta potential and the pH value, an infrared absorbing material fine particle dispersion liquid and a dried film according to Comparative Example 3 were obtained.

The obtained infrared absorbing material fine particle dispersion liquid and the dried film were evaluated and confirmed in the same manner as in Example 1. The zeta potential was 1 mV and the pH value was 4.1. The evaluation and confirmed results are shown in Table 1.

Comparative Example 4

In the same manner as in Example 1, except that hydrochloric acid as a reagent which is an acid agent was added to the infrared absorbing material fine particle dispersion liquid according to Example 4 to adjust the zeta potential and the pH value, an infrared absorbing material fine particle dispersion liquid and a dried film according to Comparative Example 4 were obtained.

The obtained infrared absorbing material fine particle dispersion liquid and the dried film were evaluated and confirmed in the same manner as in Example 1. The zeta potential was 1 mV and the pH value was 4.5. The evaluation and confirmed results are shown in Table 1.

Comparative Example 5

Forty grams (20 mass %) of the composite tungsten oxide produced in Example 1, 80 g (40 mass %) of a commercially available polymer dispersant C (a block copolymer having an amino group), 80 g (40 mass %) of water, and 750 g of φ0.3 zirconia beads were loaded into a paint shaker. Then, pulverization/dispersion treatment was carried out to obtain an infrared absorbing material fine particle dispersion liquid and a dried film according to Comparative Example 5.

The obtained infrared absorbing material fine particle dispersion liquid and the dried film were evaluated and confirmed in the same manner as in Example 1. The zeta potential was −0.5 mV and the pH value was 7.2. The evaluation and confirmed results are shown in Table 1.

SUMMARY

The infrared absorbing material fine particle dispersion liquids according to Examples 1 to 3 include, as the infrared absorbing material fine particles, the fine particles of the composite tungsten oxide represented by the general formula $CsWO_y$ being dispersed in a solvent containing water in its composition, and have an absolute value of the zeta potential of 5 mV or more and 100 mV or less. For all of these dispersion liquids after stored at 25° C. for 6 hours, the bottom of the sample bottle was visually observed to find no precipitation, indicating good stability.

On the other hand, for the infrared absorbing material fine particle dispersion liquids according to Comparative Examples 1 to 4 having an absolute value of the zeta potential out of the range of 5 mV or more and 100 mV or less, all of the bottoms of the sample bottles after storage at 25° C. for 6 months were visually observed to find precipitation, indicating poor stability.

For the infrared absorbing material fine particle dispersion liquid according to Comparative Example 5, the bottom of the sample bottle after storage at 25° C. for 6 months was visually observed to find no precipitation, indicating good stability. However, significant bleed out occurred on the dried film according to Comparative Example 5.

TABLE 1

| | Composition | | | | | Properties | | | | |
|---|---|---|---|---|---|---|---|---|---|---|
| | CsWO (mass %) | Water (mass %) | Dispersant | (mass %) | Hydrochloric acid | $D_{50}$ (nm) | Zeta Potential (mV) | pH | Long-term Stability | Visually Observed Appearance of Dried Film |
| Example 1 | 20 | 80 | — | — | — | 29 | −62 | 4.1 | o | No Bleed out |
| Example 2 | 20 | 72 | Polymer Dispersant A | 8 | — | 30 | −40 | 6.9 | o | No Bleed out |
| Example 3 | 20 | 60 | Low Molecular Weight Disprsant B | 20 | — | 22 | −70 | 5.3 | o | No Bleed out |
| Example 4 | 20 | 72 | Polymer Dispersant C | 8 | — | 38 | −23 | 6.5 | o | No Bleed out |
| Comparative Example 1 | 20 | 80 | — | — | Added | 29 | 2 | 2.4 | x | No Bleed out |
| Comparative Example 2 | 20 | 72 | Polymer Dispersant A | 8 | Added | 30 | −1 | 2.5 | x | No Bleed out |
| Comparative Example 3 | 20 | 60 | Low Molecular Weight Disprsant B | 20 | Added | 22 | 1 | 4.1 | x | No Bleed out |
| Comparative Example 4 | 20 | 72 | Polymer Dispersant C | 8 | Added | 38 | 1 | 4.5 | x | No Bleed out |
| Comparative Example 5 | 20 | 40 | Polymer Dispersant C | 40 | — | 31 | −0.5 | 7.2 | o | Significant Bleed out |

Polymer dispersant A: Compound containing organic oxo acid
Low Molecular Weight Dispersant B: Phenylalanine
Polymer dispersant C: Block copolymer containing amino group
o: No precipitation was generated at 25° C. for 6 months
x: Precipitation was generated at 25° C. for 6 months

The invention claimed is:

1. An infrared absorbing material fine particle dispersion liquid comprising:
    infrared absorbing material fine particles containing fine particles of composite tungsten oxide represented by a general formula MxWOy in which M is one or more elements selected from Cs, Rb, K, Tl, and Ba, and x and y satisfy 0.1≤x≤0.5 and 2.2≤y≤3.0;
    a dispersant containing an amino acid selected from serine and phenylalanine;
    a binder comprising a water-soluble polystyrene, a water-soluble styrene-butadiene copolymer, or an emulsion of a water-soluble acrylate ester copolymer; and
    a solvent containing water,
    wherein:
    an absolute value of a zeta potential of the infrared absorbing material fine particle dispersion liquid is 40 mV or more and 100 mV or less, and
    a pH value is 4 or more.

2. The infrared absorbing material fine particle dispersion liquid according to claim 1,
    wherein the value of the zeta potential is −100 mV or more and −40 mV or less.

3. The infrared absorbing material fine particle dispersion liquid according to claim 2,
    wherein a particle size of the composite tungsten oxide fine particle is 800 nm or less.

4. The infrared absorbing material fine particle dispersion liquid according to claim 1,
    wherein the content of the infrared absorbing material fine particles included in the infrared absorbing material fine particle dispersion liquid is 0.01 mass % or more and 80 mass % or less.

5. The infrared absorbing material fine particle dispersion liquid according to claim 4,
    wherein the value of the zeta potential is −70 mV or more and −40 mV or less, and the pH value is 4.1 or more and 6.9 or less.

6. The infrared absorbing material fine particle dispersion liquid according to claim 5,
    wherein the pH value is 7 or more and 10 or less.

7. The infrared absorbing material fine particle dispersion liquid according to claim 1, wherein the dispersant comprises serine.

8. The infrared absorbing material fine particle dispersion liquid according to claim 1, wherein the dispersant comprises phenylalanine.

9. A method for producing an infrared absorbing material fine particle dispersion, the method comprising:
    dispersing, in a solvent containing water and a dispersant comprising an amino acid selected from serine and phenylalanine:
        infrared absorbing material fine particles containing fine particles of composite tungsten oxide represented by a general formula MxWOy, in which M is one or more elements selected from Cs, Rb, K, Tl, and Ba, and x and y satisfy 0.1≤x≤0.5 and 2.2≤y≤0.30; and
        a binder comprising a water-soluble polystyrene, a water-soluble styrene-butadiene copolymer, or an emulsion of a water-soluble acrylate ester copolymer to obtain the infrared absorbing material fine particle dispersion liquid,
    wherein:
    an absolute value of a zeta potential of the infrared absorbing material fine particle dispersion liquid is 40 mV or more and 100 mV or less, and
    a pH value is 4 or more.

10. The method according to claim 9,
    wherein the value of the zeta potential is −70 mV or more and −40 mV or less, and the pH value is 4.1 or more and 6.9 or less.

11. The method according to claim 9, wherein the dispersant comprises serine.

12. The method according to claim 9, wherein the dispersant comprises phenylalanine.

* * * * *